Dec. 1, 1942.  O. STEINER  2,304,035
CAMERA SHUTTER AND LIGHT SYNCHRONIZER
Filed June 4, 1942  3 Sheets-Sheet 1
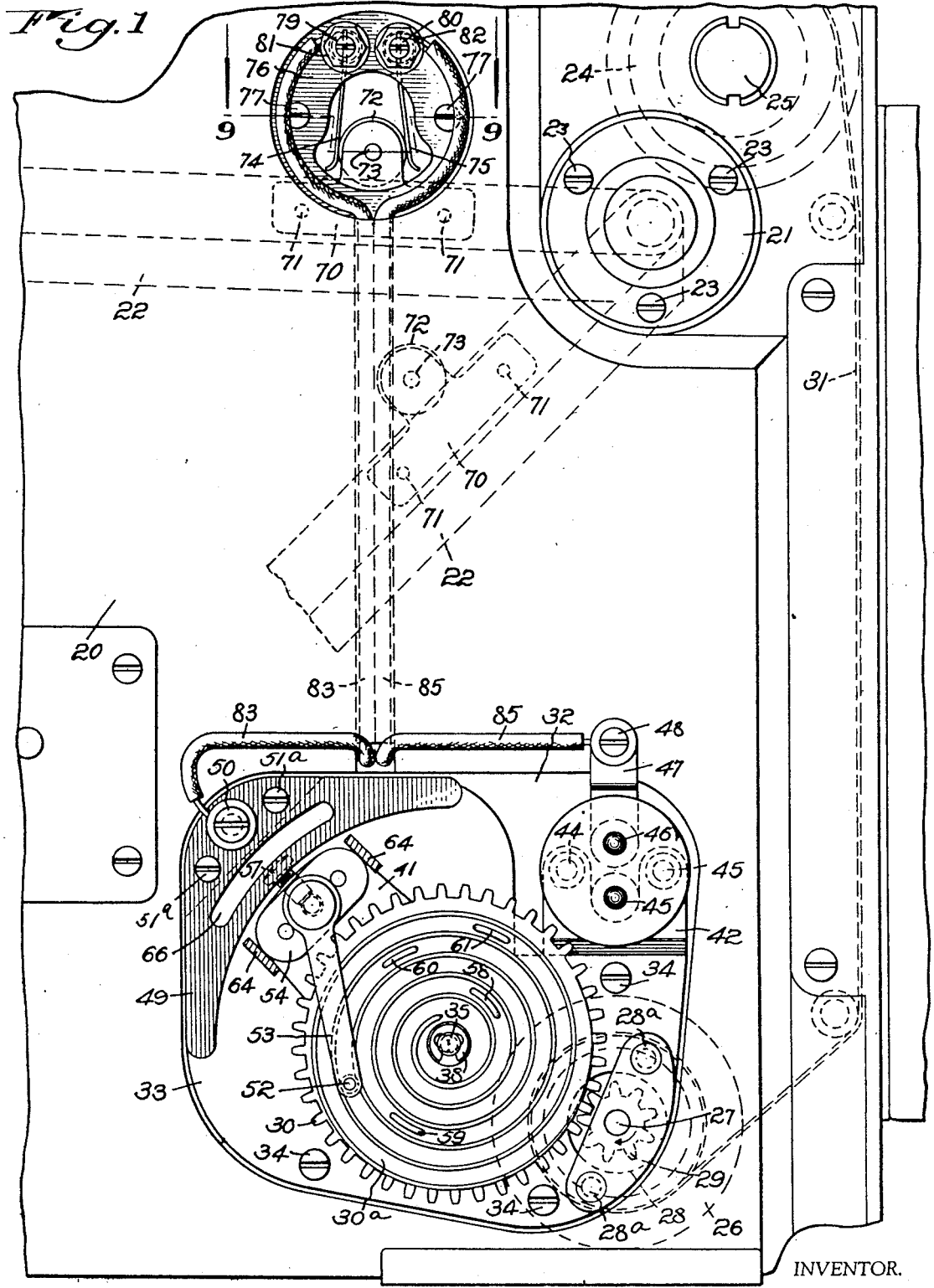
INVENTOR.
Oscar Steiner
BY
His ATTORNEYS

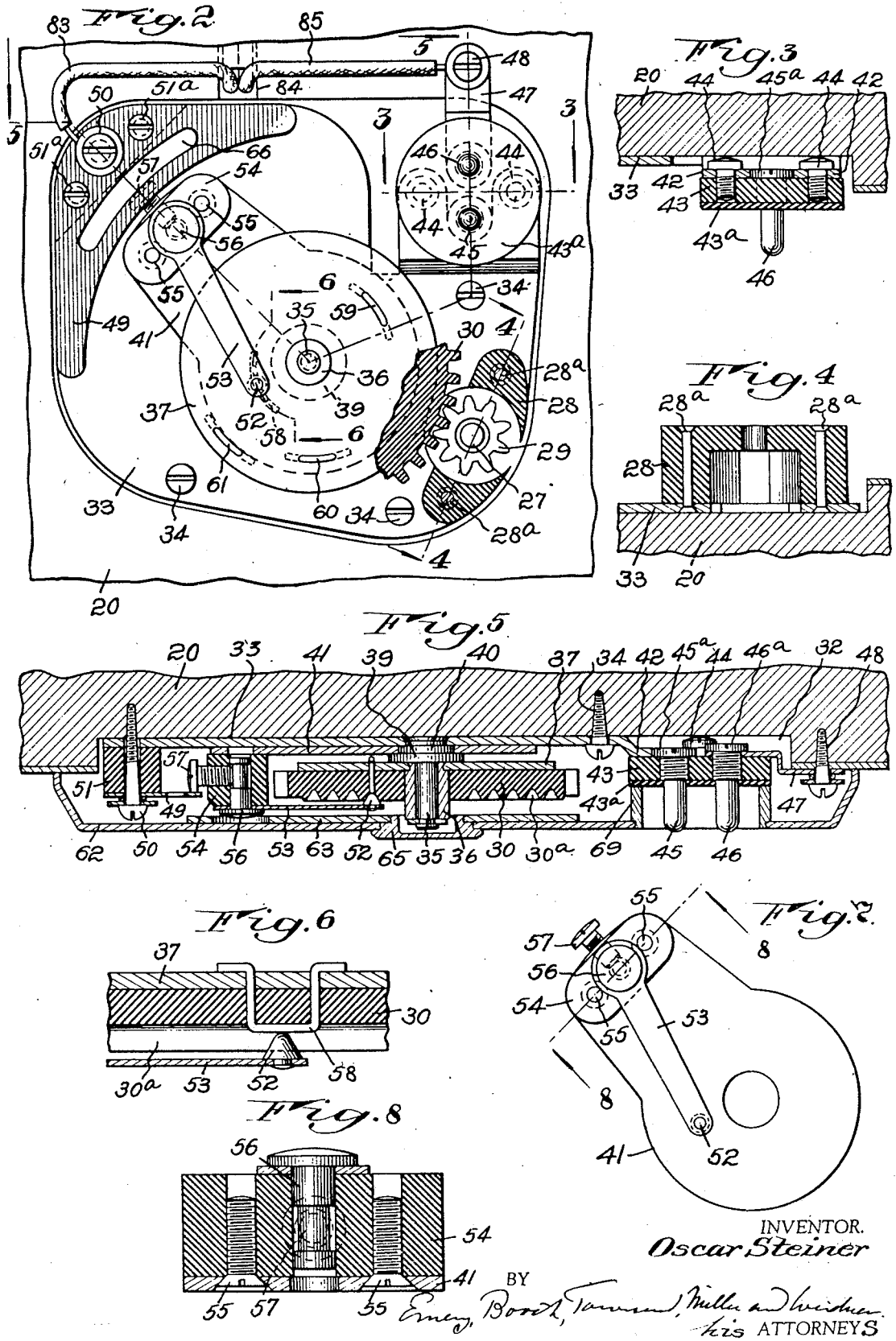

Dec. 1, 1942.  O. STEINER  2,304,035
CAMERA SHUTTER AND LIGHT SYNCHRONIZER
Filed June 4, 1942  3 Sheets-Sheet 3
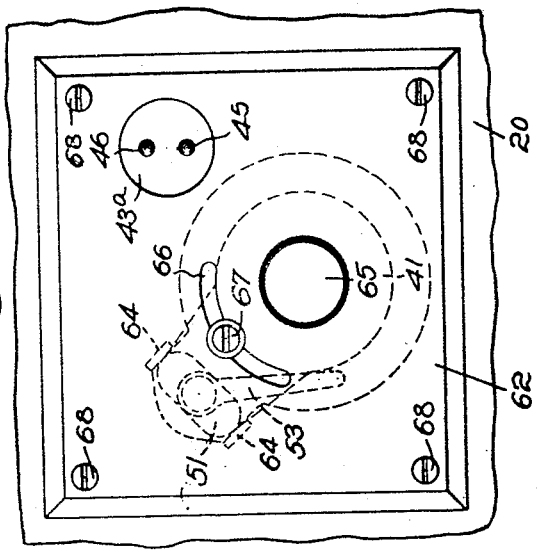
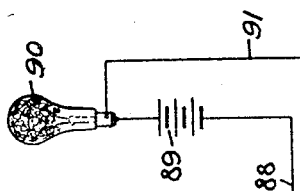
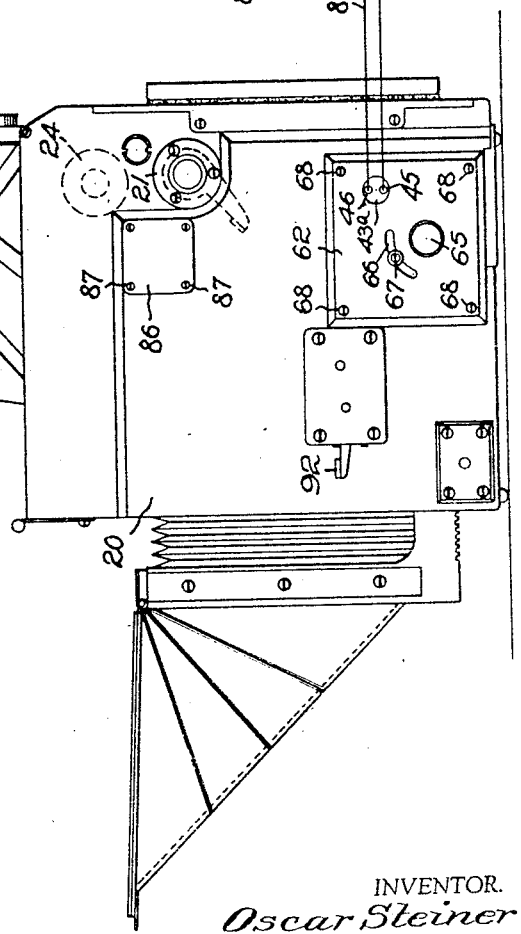
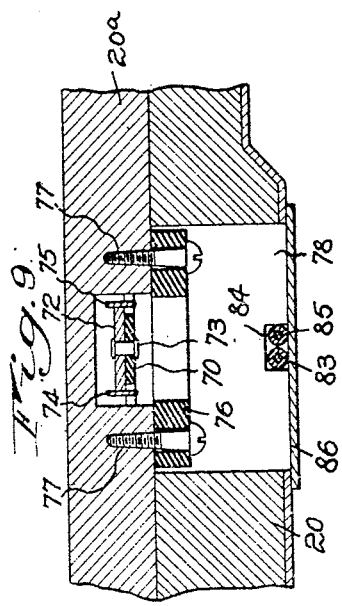
INVENTOR.
Oscar Steiner
BY
His ATTORNEYS Patented Dec. 1, 1942

2,304,035

UNITED STATES PATENT OFFICE 2,304,035

CAMERA SHUTTER AND LIGHT SYNCHRONIZER

Oscar Steiner, Rochester, N. Y., assignor to The Folmer Graflex Corporation, Rochester, N. Y., a corporation of Delaware Application June 4, 1942, Serial No. 445,702

22 Claims. (Cl. 67—29)

This invention relates to a new and improved photoflash synchronizer as applied to a focal plane shutter of the multiple aperture type.

In order that the principle of the invention may be readily understood, I have disclosed a single embodiment thereof in the accompanying drawings, wherein—

Fig. 1 is a partial or fragmentary right-hand side elevation of a camera having my invention applied thereto, certain of the mechanism covers being removed so as more clearly to show the construction of the several parts;

Fig. 2 is an enlarged detail of the electrical contact mechanism, the contact gear being partially cut way so as more clearly to show the position of the contacts and their connection to the contact plate;

Fig. 3 is a detail in horizontal section on the line 3—3 of Fig. 2;

Fig. 4 is a detail in vertical section on the line 4—4 of Fig. 2;

Fig. 5 is a horizontal section on the line 5—5 of Fig. 2;

Fig. 6 is a detail in partial vertical section on the line 6—6 of Fig. 2, showing the contact plate, the contact plate drive gear, and the traveling contact member;

Fig. 7 is a top plan view of the traveling contact member support plate;

Fig. 8 is a section on the line 8—8 of Fig. 7;

Fig. 9 is a detail in transverse section on the line 9—9 of Fig. 1 to show most clearly the mirror contact-closing device;

Fig. 10 is a right-hand side elevation of a camera of the reflex type with my invention applied thereto, the circuit diagram, including the batteries and flash lamp, being also shown; and Fig. 11 is an enlarged detail in elevation of the contact mechanism cover plate, showing the adjusting means for contact delay, and the external contact receptacle.

There has been a large number of synchronizers manufactured for application to focal plane shutters of the multiple aperture type, but all of them for one reason or another have failed to be wholly satisfactory. One of the principal reasons for such failure is that the curtain of a focal plane shutter packs (i. e.) changes its position on the shutter rewind curtain roller on consecutive exposures) thus changing the position of the contact with respect to the exposure opening, and in the case of a shutter where the contacts are carried by the curtain, as in my Patent No. 2,188,065, dated January 23, 1940, the curtain actually has a different starting position due to this so-called packing for each successive exposure, thus causing a change in the timing of the circuit to the photoflash lamp.

By my herein disclosed invention, I have overcome this condition by using the tension roller as the means of controlling the contact point. I have discovered that the curtain does not pack on the tension or take-up roller but is wound up on such roller in exactly the same manner regardless of the number of exposures that are made with any particular aperture. Therefore, I do not have in my invention any of these faults due to curtain packing that are inherent in all previous focal-plane-shutter synchronizers, so far as I am aware.

Among the objects this invention are to provide an entirely satisfactory synchronizer having a separate contact for each exposure opening in the shutter curtain; to provide a synchronizer for photoflash lamps wherein each contact always remains in a fixed relation to the curtain aperture and the curtain starting position; to provide a photoflash synchronizer that does not require constant adjustment; to provide a single adjustment for all exposure apertures for adjusting the time lag of different flash bulbs; to provide a synchronizer that will guard against the inadvertent flashing of the flash bulbs and will cause flashing only when an exposure is being made; and to provide a synchronizer of simple parts that can easily be assembled or disassembled by unskilled workmen for the purpose of repair or adjustment.

Certain means have heretofore been provided for the purpose of synchronizing the flash of a photoflash lamp with a multiple-aperture focal-plane shutter, particularly as disclosed in the patent to Oscar Steiner, No. 288,065, January 23, 1940, and in the patent to Edson S. Hineline, No. 2,284,486, May 26, 1942, wherein are disclosed mechanisms for this purpose, shown with relation to the Speed Graphic type of camera, but also adapted, as stated therein, to the reflex or reflecting type of cameras of which the Graflex camera is a well known example.

The present invention, while herein shown as used with the Graflex or reflex type of camera, is equally adapted to focal plane shutters of other types of cameras, such, for example, as the Speed Graphic or Graphic type, and will now be described with respect to the selected example of my invention without thereby limiting myself thereto.

In the practical application heretofore of mechanisms for effecting synchronization between the flash of the photoflash lamp and the functioning of a multiple-aperture focal-plane shutter curtain, such curtain packs or changes its position on the shutter-rewind curtain roller, and it is therefore difficult to maintain a synchronizing adjustment because of such packing, which is not uniform but varies from exposure to exposure. I have ascertained through a long series of experimentation that such packing does not take place on the tension roller of the shutter curtain due, as I believe, to the fact that such tension roller is driven by a spring. In the course of my said experimentation I have established it as a fact that the shutter curtain rolls upon the tension roller to the same extent with extreme accuracy, regardless of the number of exposures made with any particular setting.

It is highly desirable to have a separate contact for each exposure aperture of the shutter curtain rather than to attempt to rely upon a single contact for all the apertures of the shutter curtain.

So far as I am aware, I am the first to recognize the need or value of the tension roller of the shutter curtain for the synchronizing action (i. e. a focal plane shutter of any character using a tension roller), and, availing myself of and thoroughly testing such discovery, I have overcome the previous difficulties referred to by me. Moreover, when once the synchronizer mechanism herein disclosed is properly adjusted, contact will always take place at the correct point with respect to shutter curtain travel, regardless of the number of repeat exposures or of the extent to which the shutter curtain has been packed upon the shutter rewind curtain roller. Moreover my invention functions equally well on a reflecting type of camera and on the Graphic type, and also on other cameras using focal-plane shutter curtains having tension rollers, as, for example, a multiple-aperture focal-plane shutter-curtain.

While therefore I will specifically describe my invention as applied to a reflecting type of camera, such as the Graflex, it is to be understood that my invention is no wise limited to the embodiment herein shown.

Referring more particularly to the drawings, and first to Fig. 1 thereof, representing a right-hand elevation of part of a Graflex type of camera, as well as to Fig. 10, the camera box or casing is indicated at 20, and it is provided with an inner wall 20a shown in Fig. 9.

The said camera box or casing 20 is provided with bearing plates, one of which is shown at 21, and which plates are for the purpose of supporting the mirror frame indicated at 22 in dotted lines, both in its inclined position for focusing and exposure, and in its horizontal position. Each bearing plate 21 is secured to the camera box 20 by means of screws 23, 23.

The camera is provided with the usual shutter rewind curtain roller, shown in dotted lines at 24, such roller being supported by a suitable bearing 25 on one side of the camera, and by the shutter mechanism plate (not shown) on the opposite side thereof. The camera is also provided with a curtain-tension roller, which, for example, may be of the usual construction employed in the Graflex camera, and which roller is shown in dotted lines at 26 in Fig. 1 and has a shaft 27 carried by a bearing block 28 made from any suitable insulating material, such as Bakelite, and held to the mechanism plate hereinafter referred to more in detail, by screws or rivets 28a, 28a. The opposite end of the said tension roller 26 is supported in a suitable bearing plate at the opposite side of the camera.

While in the practice of my invention I may derive movement from the curtain tension roller in any suitable way, I have herein shown the shaft 27 thereof as having fitted thereto a pinion 29 which meshes with a contact rotary member or gear 30 having on a face thereof a spiral or coil 30a or equivalent formation. Attached to the shutter rewind curtain roller 24 and to the said curtain tension roller 26 is a plural-aperture shutter curtain 31, shown in dotted lines in Fig. 1.

Referring more particularly to Figs. 1 and 5, the camera box or casing 20 is provided with a recess 32, and attached to the bottom wall thereof is the mechanism plate 33, by means of screws 34, 34, and riveted to said mechanism plate 33 is a shoulder stud shaft 35 supporting the said contact member or gear 30 which, as shown in Fig. 5, is provided with a bushing 36 having an enlarged disk or flange 37, the whole assembly being held to the stud shaft 35 by a split retaining washer 38. The said contact member or gear 30 is held in the proper spaced relation by means of the flange 39 on the stud shaft 35, which latter is provided with an enlarged diameter step 40 having fitted thereto a contactor adjusting plate 41 held in position by said flange 39.

The mechanism plate 33 is provided with a raised extension or supporting, connecting, plug member 42, shown in section in Figs. 3 and 5, which is made up of an insulating disk 43 and washer 43a, the former being held to the extension member 42 by screws 44, 44. Threaded into the insulating disk 43 are contact plugs or members 45, 46, the former being electrically connected to said extension member 42 by an enlarged head 45a, and the latter being provided with a connecting strip 47 and a connecting screw 48. The insulating washer 43a is fitted over the said contacts 45, 46, as shown in Figs. 3 and 5. Also attached to the mechanism plate 33 is a contact plate 49, a wood screw 50 being for this purpose threaded into the camera box or casing 20, and the said contact plate 49 is separated from the mechanism plate 33 by an insulating spacing block 51, to which the said contact plate 49 is held by screws 51a, 51a. In the particular embodiment of my invention herein disclosed and in order to carry out the broad purposes thereof, in the spiral or coil 30a of the contact member or gear 30, as most clearly shown in Figs. 1 and 5, travels a contact point 52 of a contact arm 53 carried on an insulating support block 54 attached to the contactor adjusting plate 41 by screws 55, 55, shown in Figs. 7 and 8. Fitted into the support block 54 is a large head pin 56 passing through a hole in the contact arm 53 and held in adjusted position by a lock screw 57.

As best shown in the detail sectional view, Fig. 6, one of the several contacts provided on the contact member or gear 30 is represented at 58, it being a silver wire or other suitable material. It is shown as extending through holes in the contact member or gear 30 as well as through holes in the flange 37, and its ends are bent over and soldered or otherwise secured to the flange 37. The said contact member or gear 30 is, in the disclosed embodiment of my invention, provided with a number of such contacts, one for each curtain aperture. In the disclosed embodiment, I have, in Figs. 1 and 2, represented four such contacts 58, 59, 60 and 61, all desirably being of the same construction and corresponding to, and properly positioned with relation to, the four apertures provided in the shutter curtain. If the shutter curtain has a different number of apertures, the number of such contacts is in accordance therewith.

As the shutter curtain 31 is wound up on the shutter-rewind curtain roller 24, the pinion 29 will travel in a contraclockwise direction, causing the contact rotary member or gear 30 to be turned in a clockwise direction, thereby causing the contact point 52 to travel in the spiral or coil 30a in an outward direction until a position is reached wherein the said contact point 52 will be in the outermost turn of the spiral or coil 30a of said contact member or gear 30, being just beyond that shown in Fig. 1.

The shutter curtain 31 will now be fully rewound and the smallest curtain aperture will accordingly be in place for making an exposure. When the shutter-rewind curtain roller 24 is released, allowing the shutter curtain 31 to travel downward in the direction of the arrow in Fig. 1 and to be wound up on the curtain tension roller 26, the pinion 29 will turn in a clockwise direction viewing Fig. 1, and the gear or member 30 will turn in a contraclockwise direction, as indicated by the arrow in Fig. 1, until the selected curtain aperture has traveled all the way across the exposure opening. As the contact member or gear 30 turns in a contraclockwise direction, the contact point 52 of the arm 53 will ride in the spiral or coil 30a, and as the contact 61 (or other selected contact, as the case may be) passes under the contact point 52, an electrical contact will take place, thereby closing the circuit to the flashlamp in a manner to be referred to more in detail at a subsequent point in the specification.

I provide means for adjusting the position of the said contact point 52 of the arm 53 in a circumferential direction relative to the contact member or gear 30 with respect to the several contacts 58, 59, 60, 61 carried thereby, and after such adjustment has once been made, no further attention thereto is necessary. For the said purpose I have provided the following construction to which my invention is not limited.

To the inner face of a mechanism cover plate 62, shown in Figs. 5, 10 and 11, is attached an adjusting part or plate 63 of any suitable shape, and having inwardly extending fingers 64, 64, shown in Figs. 1 and 11, for engaging both ends of the contact support block 54 so as by adjusting movement of plate 63 to control the position thereof. The said adjusting part or plate 63 is held to the mechanism cover plate 62 by means of a shoulder bushing 65, most clearly shown in Fig. 5. The said mechanism cover plate 62 is provided with an arcuate slot 66 through which passes a clamping screw 67 threaded into the said adjusting part or plate 63, as shown in Fig. 11, wherein the said adjusting part or plate is indicated in dotted lines, and wherein the mechanism cover plate 62 is shown as held in the camera box or casing 20 by a series of screws 68.

In order to adjust the timing of the contact point 52 with respect to all of the several contacts carried by contact member or gear 30, the said contactor adjusting plate 41 carrying the contact arm 53 with its contact point 52 is shifted with respect to shaft 35 in either a clockwise or contraclockwise direction, by movement of the said contactor adjusting plate 41 about the shaft 35 as a center, the direction of movement depending upon whether it is desired to have the contact occur earlier or later. If the contactor adjusting plate 41 is moved in a contraclockwise direction, the contact will take place later, but if said contactor adjusting plate 41 is moved in a clockwise direction, the contact will take place earlier. In order to make the said adjustment the clamping screw 67 is loosened and turned in the slot 66, shown in Figs. 1, 2, 10 and 11, to the right or to the left to the desired extent, and is then securely clamped in position. As shown in Fig. 5, the mechanism cover plate 62 is provided with a bushing 69 in order to form a shell or guide for the contact plugs or members 45, 46, and also for holding the insulating washer 43a in place.

In order to prevent flashing of the photoflash bulb while rewinding the shutter or while changing the position of the shutter curtain to secure a different shutter speed, I have provided an auxiliary switch in series with the said flashlamp, and in the disclosed embodiment of the invention applied to a reflex type of camera, it is controlled by the movement of the mirror. For this purpose, as indicated in dotted lines in Fig. 1 and as shown in Fig. 9, there is attached to the mirror frame 22 a plate 70 of suitable insulating material by means of rivets 71, 71. To the said plate 70 is attached a suitable member or part herein shown as a disk 72, being held in place by a shoulder rivet 73. The said member or disk 72 may obviously be of any suitable shape.

When the mirror is in its set position (that is, when in inclined position ready for making an exposure), it is, as shown, at an angle approximately of 45° to the lens axis. When the mirror is released in the act of making an exposure, it travels in an upward direction to its horizontal position approximately parallel to the lens axis, and when in this latter position, as shown in dotted lines in Fig. 1, the disk 72 enters between and engages contact fingers 74, 75 on a contact supporting block 76 held to the inner camera wall 20a by means of wood screws 77, 77, shown in Fig. 9. The camera box or casing 20 is provided, as shown in Fig. 9, with a suitable hole or recess 78 for receiving the said contact supporting block 76, which has attached thereto contact studs 79, 80, shown in Fig. 1, having clamping nuts 81, 82 respectively. The contact finger 74 is attached to the stud 79 and the contact finger 75 is attached to the stud 80.

When the mirror is in the position indicated by the upper or horizontal dotted lines in Fig. 1, a circuit is closed between the contact finger 74, contact disk 72 and contact finger 75. Connected to the stud 79 by means of a nut 81 is an electrical conductor 83, indicated in Fig. 9 as lying in the slot or channel 84 of the camera box or casing 20. The opposite end of said electrical conductor 83 is attached to the contact plate 49 by means of the screw 50, best shown in Fig. 1, and attached to the stud 80 by means of the nut 82 is a second electrical conductor 85 lying in slot or channel 84. The opposite end of said conductor 85 is connected to the strap or contact member 47 by the clamping screw 48.

In order to provide means permitting inspection of the contacts or other parts of the auxiliary switch, I have provided, as shown in Figs. 9 and 10, a cover 86 attached to the camera box or casing 20 by screws 87, 87. The electrical circuit is completed through contact 46, conductor 88, battery 89, flashlamp 90, conductor 91, contact 45, extension member 42, plate 33, shaft 35, flange 37, contact 58, 59, 60 or 61, as the case may be, contact 52, contact spring 53, pin 56, clamping screw 57 and contact plate 49.

In the operation of my invention, and referring to the selected example thereof, the focal plane shutter curtain is set in the usual manner for any particular shutter curtain aperture. For example, the No. 2 aperture, which corresponds to the second highest shutter speed, is selected, and the mechanism will be in the condition shown in Fig. 1, the mirror 22 being in its inclined position for focusing. The contact point 52 will be in the spiral or coil 30a and the contact 60 will accordingly be in position to make electrical contact with the contact point 52, approximately twenty milliseconds before the curtain aperture reaches the exposure opening of the sensitized material holder. When the mirror 22 is released in the usual manner by the mirror release lever 92, shown in Fig. 10, the said mirror travels in an upward direction until the position is reached indicated by the horizontal dotted lines in Fig. 1, thus causing a circuit to be completed between contact fingers 74, 75 by means of the contact member or disk 72, thus completing a circuit between the conductors 83, 85. The shutter curtain 31 is released and runs in a downward direction onto the spool of the tension roller 26, turning the pinion 29 in a clockwise direction, as indicated by the arrow in Fig. 1, and the gear 30 in a contraclockwise direction. When the contact 60, in the present instance, reaches the contact point 52 of the arm 53, a connection is completed between the contact 46, the battery 89, the photoflash lamp 90 and the contact 45, as previously described. The fuse of the lamp 90 will then be ignited and the duration of the flash is sufficiently long to allow the selected curtain aperture to travel all the way across the exposure opening.

In order to compensate for different lengths of shutter curtain runs and for different time delays, the position of the contact point 52 of contact arm 53 is adjusted in the manner described, by loosening the clamp screw 67 (Figs. 10 and 11) and shifting said screw 67 either in a clockwise direction or in a contraclockwise direction, until the said contact point 52 of the contact arm 53 is the right distance from the selected contact 60 to cause the flash to take place just as the selected curtain aperture reaches the exposure opening. When a different shutter speed is selected, a different contact of the series of contacts 58, 59, 60 and 61 on contact member or gear 30 will be in position. These several contacts 58, 59, 60, 61, are secured on said contact member or gear 30 in proper spaced relation to the shutter curtain so as properly to time the contact for each curtain aperture, and when once the proper locations have been determined for the said contacts 58, 59, 60, 61 (or whatever the number thereof may be), said contacts will always be in correct position as the spacing of the curtain apertures remain fixed.

It is, however, necessary to provide an adjustment to compensate for the different positions that the shutter curtain may be mounted to the shutter-rewind curtain-roller 24 or tension roller 26 with respect to the contact member or gear 30. The adjustment just described fully takes care of such condition as well as for any change in the time lag of the flash bulb.

The photographic equipment herein disclosed as a selected example thereof, is the result of a long period of intensive research work for the purpose of providing a synchronizer that will properly function with a focal-plane shutter of the multiple aperture type under all conditions, and has been reduced to practice and tested under severest conditions. The present invention overcomes all of the difficulties to which I have referred in synchronizing photoflash lamps with a multiple-aperture focal-plane shutter, for which purpose it utilizes the tension roller in effecting the desired synchronization, and when the synchronizer is properly adjusted contacts always take place at the correct point with respect to curtain travel, regardless of the number of repeat exposures and regardless of any packing of the shutter curtain on the shutter-rewind curtain roller.

If the invention be applied to a Graphic type of camera, the circuit through the conductors 83, 85 would be completed by an electrical switch controlled by the usual shutter release lever, a switch for such general purpose being shown in the patent to Hineline No. 2,284,486, above referred to.

Having thus described one illustrative embodiment of the invention, it is to be understood that although specific terms are employed, they are used in a generic and descriptive sense and not for purposes of limitation, the scope of the invention being set forth in the following claims.

I claim:

1. Means for effecting synchronization of the flash of a photoflash lamp with the shutter action of a photographic camera equipped with a shutter curtain, such means including the following parts: a camera having a photoflash lamp, an electric circuit applied to said camera and including said lamp and also including contacts for closing said circuit in effecting such synchronization, an apertured shutter curtain mounted in said camera and provided with a shutter rewind curtain roller and a take-up tension roller, and means for controlling said synchronization from the said take-up tension roller of said shutter curtain.

2. A combination according to claim 1, but wherein the said shutter curtain has a plurality of exposure apertures and wherein said synchronization is controlled with respect to each exposure aperture from the said take-up tension roller.

3. Means for effecting synchronization of the flash of a photoflash lamp with the shutter action of a photographic camera equipped with a shutter curtain, such means including the following parts: a camera having a photoflash lamp, an electric circuit applied to said camera and including said lamp and also including contacts for closing said circuit in effecting such synchronization, an apertured shutter curtain mounted in said camera and provided with a shutter rewind curtain roller and a take-up tension roller, means carried by the camera and movable for completing said circuit thereby to cause the flashing of said lamp by so completing the circuit, and means to release the shutter curtain to make during curtain passage an exposure at an aperture thereof, said means for completing the circuit being controlled by said curtain take-up tension roller.

4. Means for effecting synchronization of the flash of a photoflash lamp with the shutter action of a photographic camera equipped with a shutter curtain, such means including the following parts: a camera having a photoflash lamp, an electric circuit applied to said camera and including said lamp and also including contacts for closing said circuit in effecting such synchronization, an apertured shutter curtain mounted in said camera and provided with a shutter rewind curtain roller and a take-up tension roller, and means for completing the circuit in effecting such synchronization, said means being operatively connected to the said take-up tension roller.

5. A combination according to claim 1, but wherein means are provided to vary the exact instant for completing the circuit and the flashing of the photoflash lamp, with relation to the instant of the exposure passage of the selected aperture of the curtain, so as to effect synchronization of the flashing of the lamp and the exposure passage of the selected curtain aperture.

6. A combination according to claim 1, but wherein manually adjustable means are provided to vary the instant of the completion of the circuit through said contacts with respect to the exposure passage of the shutter curtain aperture across the focal plane, so as by reason of such manual adjustment to cause simultaneous flashing of the lamp at the exposure passage of the shutter curtain aperture across the focal plane.

7. A combination according to claim 1, but wherein the said shutter curtain is provided with a plurality of exposure apertures, and wherein means is provided to release said shutter curtain so as to make an exposure at a selected aperture thereof.

8. Means for effecting synchronization of the flash of a photoflash lamp with the shutter action of a photographic camera equipped with a shutter curtain, such means including the following parts: a camera having a photoflash lamp, an electric circuit applied to said camera and including said lamp and also including contacts for closing said circuit in effecting such synchronization, an apertured shutter curtain mounted in said camera and provided with a shutter rewind curtain roller and a take-up tension roller, and means connected in movement with the movement of the take-up tension roller for controlling said synchronization.

9. Means for effecting synchronization of the flash of a photoflash lamp with the shutter action of a photographic camera equipped with a shutter curtain, such means including the following parts: a camera having a photoflash lamp, an electric circuit applied to said camera and including said lamp and also including contacts for closing said circuit in effecting such synchronization, an apertured shutter curtain mounted in said camera and provided with a shutter rewind curtain roller and a take-up tension roller, and means rotatable with the take-up tension roller for controlling said synchronization.

10. A combination according to claim 9, but wherein said means rotatable with the take-up tension roller includes a gear with a spiral or coil.

11. A combination according to claim 9, but in which said means rotatable with the take-up tension roller includes a contact gear having on a face thereof a spiral or coil.

12. A combination according to claim 9, but wherein said means rotatable with the take-up tension roller includes a rotatable member having a series of contacts corresponding in number with the number of apertures of the shutter curtain.

13. A combination according to claim 9, but wherein said means rotatable with the take-up tension roller includes a pinion on the shaft of the take-up tension roller and a contact gear in mesh with said pinion.

14. A combination according to claim 9, but wherein said means rotatable with the take-up tension roller includes a pinion on the shaft of the take-up tension roller and a contact gear in mesh with said pinion, said contact gear having a spiral on one face thereof, and a number of contacts at said spiral corresponding in number with the number of apertures in the shutter curtain.

15. A combination according to claim 9, but wherein said means rotatable with the take-up tension roller includes a pinion on the shaft of the take-up tension roller and a contact gear in mesh with said pinion, said contact gear having a spiral on one face thereof, and a number of contacts at said spiral corresponding in number with the number of apertures in the shutter curtain, together with a contact arm 53 having a contact point 52 for engagement with said contacts at said spiral.

16. A combination according to claim 9, but wherein said means rotatable with the take-up tension roller includes a pinion on the shaft of the take-up tension roller and a contact gear in mesh with said pinion, said contact gear having a spiral on one face thereof, and a number of contacts at said spiral corresponding in number with the number of apertures in the shutter curtain, together with a contact arm 53 having a contact point 52 for engagement with said contacts at said spiral, and a mechanism plate 33, a contactor adjusting plate 41, and contact members 45, 46.

17. A combination according to claim 9, but wherein said means rotatable with the take-up tension roller includes a pinion on the shaft of the take-up tension roller and a contact gear in mesh with said pinion, said contact gear having a spiral on one face thereof, and a number of contacts at said spiral corresponding in number with the number of apertures in the shutter curtain, together with a contact arm 53 having a contact point 52 for engagement with said contacts at said spiral, and means for adjusting the position of the contact point 52 with respect to the contacts at said spiral.

18. A combination according to claim 9, but wherein said means rotatable with the take-up tension roller includes a pinion on the shaft of the take-up tension roller and a contact gear in mesh with said pinion, said contact gear having a spiral on one face thereof, and a number of contacts at said spiral corresponding in number with the number of apertures in the shutter curtain, together with a contact arm 53 having a contact point 52 for engagement with said contacts at said spiral, and means for adjusting the position of the contact point 52 with respect to the contacts at said spiral, said adjusting means including an adjusting plate 63 having fingers 64, 64, a support block 54 engaged by said fingers, and a contactor adjusting plate 41 carrying said contact arm 53.

19. A combination according to claim 9, but wherein said means rotatable with the take-up tension roller includes a pinion on the shaft of the take-up tension roller and a contact gear in mesh with said pinion, said contact gear having a spiral on one face thereof, and a number of contacts at said spiral corresponding in number with the number of apertures in the shutter curtain, together with a contact arm 53 having a contact point 52 for engagement with said contacts at said spiral, and means for adjusting the position of the contact point 52 with respect to the contacts at said spiral, said adjusting means including an adjusting plate 63 having fingers 64, 64, a support block 54 engaged by said fingers, and a contactor adjusting plate 41 carrying said contact arm 53, said plate 41 being turnable in opposite directions to advance or to retard the instant of contact.

20. A combination according to claim 9, but wherein said means rotatable with the take-up tension roller includes a pinion on the shaft of the take-up tension roller and a contact gear in mesh with said pinion, said contact gear having a spiral on one face thereof, and a number of contacts at said spiral corresponding in number with the number of apertures in the shutter curtain, together with a contact arm 53 having a contact point 52 for engagement with said contacts at said spiral, and means for adjusting the position of the contact point 52 with respect to the contacts at said spiral, said adjusting means including an adjusting plate 63 having fingers 64, 64, a support block 54 engaged by said fingers, and a contactor adjusting plate 41 carrying said contact arm 53, and an adjusting screw 67 threaded into the adjusting plate 63.

21. A combination according to claim 1, but wherein the camera is a reflex camera having a pivoted mirror and wherein means is provided to prevent flashing of the bulb when rewinding the shutter in action, said means including an auxiliary switch in series with the flash lamp and controlled by the mirror movement.

22. A combination according to claim 1, but wherein the camera is a reflex camera having a pivoted mirror and wherein means is provided to prevent flashing of the bulb when rewinding the shutter in action, said means including an auxiliary switch in series with the flash lamp and controlled by the mirror movement, the mirror frame for such purpose being a part 72 and the camera casing having contacts 74, 75 to be engaged by said part 72.

OSCAR STEINER.